Feb. 5, 1963    R. A. O'DELL    3,076,567
ADJUSTABLE CAPACITY SWEEP CONVEYOR FOR STORAGE CONTAINERS
Filed Aug. 2, 1961    2 Sheets-Sheet 1

INVENTOR.
Richard A. O'Dell
BY
ATTORNEY.

Feb. 5, 1963   R. A. O'DELL   3,076,567
ADJUSTABLE CAPACITY SWEEP CONVEYOR FOR STORAGE CONTAINERS
Filed Aug. 2, 1961   2 Sheets-Sheet 2

INVENTOR.
Richard A. O'Dell
BY Thos. E. Scofield
ATTORNEY.

United States Patent Office 3,076,567
Patented Feb. 5, 1963

3,076,567
ADJUSTABLE CAPACITY SWEEP CONVEYOR FOR STORAGE CONTAINERS
Richard A. O'Dell, Independence, Mo., assignor to Butler Manufacturing Company, a corporation of Missouri
Filed Aug. 2, 1961, Ser. No. 128,771
8 Claims. (Cl. 214—17)

This invention relates generally to the removal of bulk material from storage containers such as tanks, bins, silos and the like, and refers more particularly to an improved sweep conveyor of the auger type in which the capacity of the auger can be controlled to produce efficient removal of material having widely varying properties of density, shape of particles, cohesiveness and moisture content.

One of the principal objectives of the present invention is to prdovide a low cost, yet highly effective, free swinging sweep auger which finds its principal advantage in its ability to be used for achieving complete removal of grain or other pulverulent materials to a central bottom discharge outlet in the floor of a storage bin or tank. One of the most unique and valuable features of the invention is that it provides an auger unit which includes means by which the capacity of the auger can be varied to accommodate it to materials of differing properties and qualities with a minimum of time and effort.

As is known to those skilled in the sweep auger art, the auger, to be effective, must dig into the particle mass sufficiently to cause the flights to impel the particles toward the discharge end of the auger. At the same time there is, in many materials, a tendency of the auger to ride on top of the mass and to sweep freely around the top of the mass. Effective auger capacity is only obtained when both of these resultants are so coordinated as to produce a combined digging in and sweeping action.

Efforts have been made in the past to provide sweep augers with the ability to change the relationship between the sweeping and digging in tendencies so as to accommodate the auger to various types of materials. Puckett Patent 2,934,224 teaches an arrangement in which the auger is provided with a controlled powered sweep which can be adjusted as to value by a drag brake on the auger. A pending application of Alan R. Cook, Serial 78,519, filed December 27, 1960, discloses a powered sweep auger wherein the resistance to movement of the material by the auger is put to use in controlling the rate of sweep through offsetting the longitudinal axis of the auger from the sweep center. In both the foregoing cases the auger drive is achieved through a gear train from which sweeping torque on the auger also results.

The present invention provides an adjustable capacity auger which avoids the necessity of complex gear trains, drag brakes and the like and which can readily be adjusted to proper capacity when installed in the storage container. The adjustment of capacity is achieved in rapid and simple fashion and the arrangement is such that successive adjustments while the unit is in place in the container can be made if necessary.

A further object of the invention is to provide a variable capacity sweep auger of the character described in which the only power necessary to achieve effective sweep and material removing action is a power drive directly to the auger shaft itself. One of the principal advantages of this aspect of the invention is that it provides for a unit which can be easily shifted as a unit from one bin or tank to another, thus obviating the necessity of providing each bin or tank with a permanent internal power drive and transmission means.

Still another object of the invention is to provide a sweep auger of the character described in which the auger requires considerably less power to operate than is the case with augers which are confined to a single sweep plane and which still obtains a greater capacity than other free swinging augers of which I am aware.

Other and further objects of the invention together with the features of novelty appurtenant thereto will appear in the course of the following description.

In the accompanying drawings which form a part of the specification and are to be read in conjunction therewith and in which like reference numerals indicate like parts in the various views:

FIG. 1 is a fragmentary plan view of the inside bottom of a typical storage bin having a conveyor unit according to the invention placed therein, the bin wall being shown in section;

FIG. 2 includes a side-elevational view of the conveyor unit, the bin wall, foundation and lateral take-out auger tube being shown in section;

Figure 1:
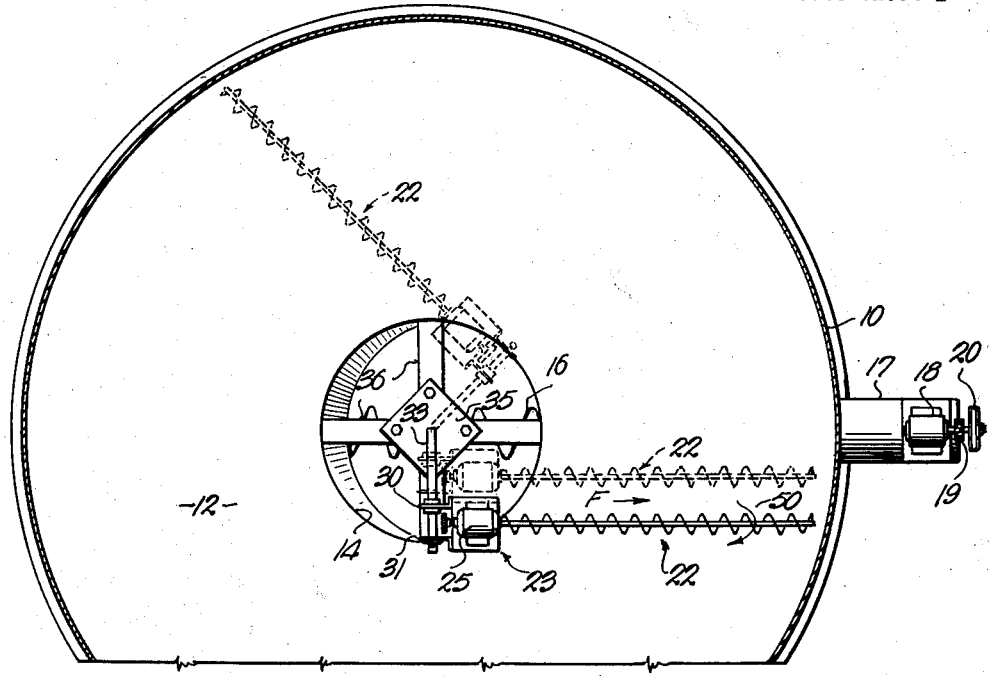
Figure 2:
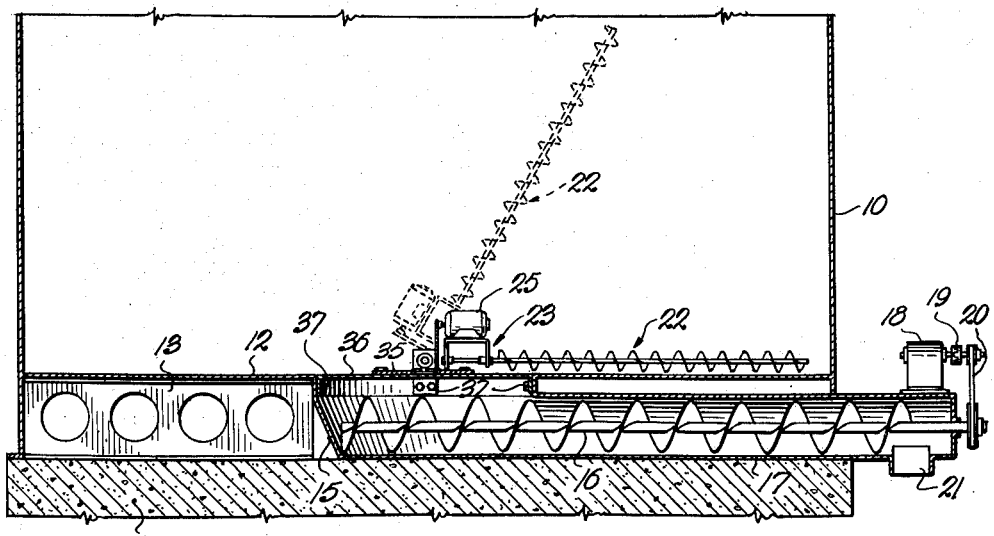

Referring now to the drawings and initially to FIGS. 1 and 2, reference numeral 10 indicates the circular side wall of a typical bulk storage bin adapted to be filled with particulate or pulverulent materials, for example grains and the like. While not shown, it will be understood that such a tank has a top opening for filling purposes and that the material will, when delivered to the bin, fill the same to the desired level. The bin is supported generally on a foundation 11 which may be of concrete. In the particular bin here under consideration the bin floor 12 is elevated above and supported on the foundation, as by radial supports 13. A circular discharge outlet 14 is provided centrally in the floor 13 and this forms the upper end of a hopper-like cavity 15 into which extends one end of a take-out auger 16.

The take-out auger is contained within an auger tube 17 which extends radially from the hopper 15 through side wall 10. A drive motor 18 may be supported on the extending end of the auger tube. Motor 18 is drivingly connected with the take-out auger through a clutch 19 and drive belt 20. An outlet 21 is provided for receiving materials moved from the bin through the tube by the take-out auger.

The internal conveyor unit which serves to draw material from the sides of the bin toward the central bottom outlet 14 includes an elongate auger 22. It may be of assistance to note at this point that ordinarily the internal auger unit will not be placed in the bin until such time as all material possible has been exhausted by relying solely on gravity feed to the hopper 15. Once gravity feed stops there still is considerable material left in the bin. Generally speaking the remaining material will lie in the form of an annular ring having an inclined or conical top surface, the angle of inclination being determined by the angle of repose of the material. I have not, however, shown in the drawings the undelivered material.

The auger 22 extends from and is journaled at its inner end in a U-shaped member 23 having the spaced parallel downwardly extending legs 23a and 23b. Each leg is apertured to receive a bearing 24 and the auger shaft 22a extends in a rotatable fit through the bearings.

The top of the member 23 forms a mounting platform for a power unit 25 which is preferably an electric motor. The motor is bolted to member 23 as by bolts 26. The drive shaft 25a of the motor has keyed thereto a sprocket 27. A drive chain 28 joins the sprocket 27 with a sprocket 29 keyed to the auger shaft 22a. A belt drive may alternatively be employed.

Extending on inwardly of the bin from the member 23 are a pair of spaced parallel plate-like elements 30 and 31. These each may conveniently be L-shaped, having base portions 30a, 31a which are bolted firmly to the inside leg 23 by bolts 32.

Figure 4:
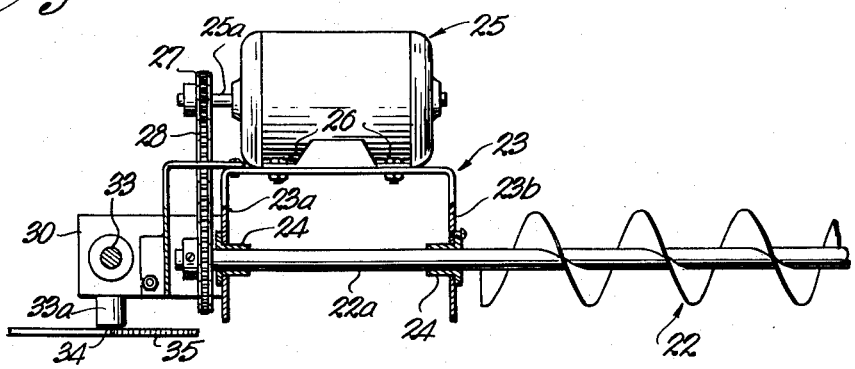
FIG. 4 is an enlarged side-elevational view, partly in section, showing also the pivot support plate for the unit.
Figure 5:
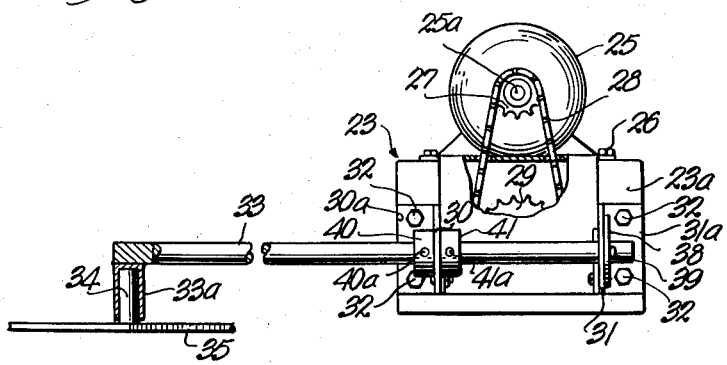
FIG. 5 is an end-elevational view taken from the left-hand end of FIG. 4, parts broken away and other parts shown in section, all for the purposes of illustration.

Near their outer ends the elements 30 an 31 are each provided with coaxial apertures which have extending therethrough in a slidable and rotatable fit a rod-like arm member 33. Arm 33 is supported above the level of the bin floor. As is best seen in FIGS. 4 and 5 the support for the arm comprises a socket member 33a rigidly secured to the arm and set down upon an upstanding cylindrical pin 34. The socket member 33a has a socket which rotatably fits over the pin, the depth of the socket being such that the socket member can turn upon the pin without undue frictional interference.

The pin 34 is in turn rigidly supported at the center of the bottom discharge aperture 14 of the bin. This may be accomplished in any fashion that permits egress of material from the bin through aperture 14 into the hopper 15. Preferably the pin is supported on a plate 35 which in turn is bolted down on top of diametrically intersecting cross braces 36 anchored at their ends as at 37 to the upper end of the hopper.

Figure 3:
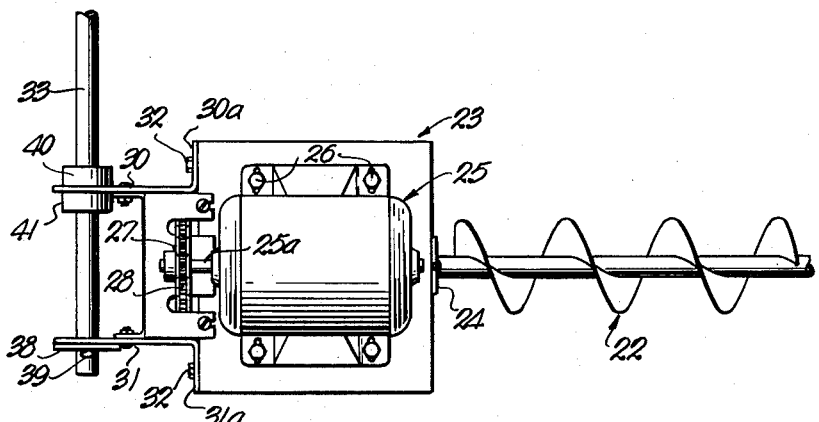
FIG. 3 is an enlarged fragmentary top plan view of the conveyor unit.

Returning now to the manner of supporting the auger 22 on arm 33, it will be observed that the arm is of substantially greater length than the spacing between the carrier plates 30 and 31. In FIGS. 1, 3 and 5 the unit is shown at its outermost position on the arm. An enlarged washer or stop ring 38 limits the outward movement. A cotter or other type pin 39 serves to retain the washer against movement off the end of the arm. Stop ring 38 thus provides an abutment which engages plate member 31 as the carrier 23 is slid longitudinally along the arm toward the outer end of the latter.

Means for selectively indexing the position of the carrier lengthwise of the arm 33 inwardly of the endmost position shown in solid lines is provided in the form of a pair of locking collars 40, 41 which encircle the arm on opposite sides of the inner plate member 30. Each of these collars is provided with a releasable set screw 40a, 41a (FIG. 5) through which it can be locked to the arm at any desired position therealong. In FIG. 1 I have shown in one set of broken lines an alternative position for the auger and its carrier inwardly of the outermost position.

From the description as thus far given it will be apparent that the carrier unit 23 is supported on arm 33 with the auger extending substantially normal to the arm. As a result of the structure employed the auger axis is thus offset from the vertical axis of the central pivot pin 34, the degree or distance of offset depending on the lengthwise position of the carrier on the arm. It will also be observed that no matter at what position on the arm the carrier may be placed, the carrrier is rotatable along with the auger and motor about the axis of the arm; in other words, the auger can be swung in a vertical plane as is demonstrated by the broken lines in FIG. 2.

The direction of offset of the axis of auger 22 from the central pivot 34 is important. In the embodiment shown and thus far described, it is such that the resistance of the material to movement inwardly along the auger creates a thrust moment acting about the pivot tending to swing the auger in the opposite direction from the rolling translation of the auger. This may better be understood by again referring to FIG. 1.

The auger shown in FIG. 1 (and in the succeeding figures) is a right-hand auger which is driven in the direction of arrow 50. Thus the turning of the auger normally would result in rolling of the auger about the bin in a clockwise direction. Assuming, however, that the auger flights are to some extent embedded in the material to be removed, a reaction F is set up by the action of the auger flights on the material. As is evident, this reaction force (or axial thrust) creates a counter moment tending to swing the auger 22 counterclockwise about its pivot 34. This counter moment tends to slow down the sweep rate of the auger and produces in the auger a greater inward movement of material per revolution of the auger about its own axis. It will thus be seen that by adjusting the offset of the axis of the auger 22 from the pivot 34 in relation to the particular material involved, the power of the motor can be utilized to the optimum to achieve inward movement of material by the auger along with a uniform sweeping action. For example a coarse material may, with only a small degree of offset, allow the auger to convey only with the lower half of the blades. Stated otherwise, the resistance to clockwise swinging afforded by force F is, in the example being given, not enough to keep the auger fully embedded. By increasing the offset the moment exerted by force F is also increased, thus slowing down the sweep rate and increasing the rate of inward movement of material per revolution of the auger about its own axis.

The same advantages can be achieved in finer materials. By properly balancing the thrust moment and translational moment the auger can be made to sweep at a rate which achieves optimum material moving efficiency. While the degree of offset most often will have to be determined by trial following installation of the auger in a bin of a particular material, this is easily accomplished by releasing the collars 40 and 41 and moving the carrier to the new position on the arm. The offset to be used is dependent principally on the type and condition of the material to be conveyed but it is readily determined by anyone familiar with the auger operation.

The adjustability of the offset of the auger axis from the central pivot also permits the utilization of the power to cause the auger to dig more deeply into the grain mass, or to advance more rapidly in the direction of sweep, as the case may require. As the counter moment set up by the axial thrust is increased the power of the auger is utilized more and more to cause the flights to imbed in the material mass. The unit is thus readily adaptable to materials of widely varying properties and qualities and will convey as readily in one as the other.

Obviously, in situations where the character of the material is such that even at the innermost position for the auger, the sweep rate is too slow, the auger can be reversed on the arm so that the auger thrust assists rather than acts against the rolling translation. To accomplish this, pin 39 would be removed, collars 40 and 41 loosened, and these parts as well as the auger mount slipped off the end of the arm. The auger is then turned 180° and replaced on the arm along with the collars, and the pin 39 reinserted. The auger is as fully adjustable inwardly and outwardly on the arm in the reversed condition as in the former condition, and thus can be spaced the correct distance from the pivot axis to obtain optimum delivery.

It will further be evident that the installation of the conveyor unit in, or its removal from, the bin is a simple task. All that need be done is, in the case of installation, to fit socket member 33 over the upstanding pin 34. The free rotatability of the carrier and auger about the arm 33 permits the auger 22 to be laid on top of the inclined surface of the remaining material and further permits the auger 22 to descend toward the horizontal as material is progressively removed. To remove the unit from the bin it simply is lifted free of the pin 34.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown

Having thus described my invention, I claim:

1. A materials conveyor operable to draw materials toward a central discharge zone from the area surrounding said zone comprising a conveyor mounting member at said zone, an arm connected with said member for swinging movement around said member about a substantially vertical axis, a conveyor carrier mounted on said arm, said carrier movable on said arm toward and away from said axis, an elongate power driven conveyor connected with said carrier and movable therewith, said conveyor having an inner discharge end adjacent said zone and extending transversely with respect to said arm and including material engaging means operable to draw material toward said zone, and releasable means operable to restrict said carrier to a plurality of positions on said arm at selected varied spacings from said axis.

2. A materials conveyor as in claim 1 wherein said material engaging means comprises an auger flighting on said conveyor.

3. A materials conveyor as in claim 1 in which said conveyor is mounted for swinging movement about said arm in a substantially vertical plane.

4. A materials conveyor as in claim 2 in which said carrier is swingably mounted on said arm whereby to permit swinging movement of said conveyor in a substantially vertical plane.

5. A materials conveyor operable to draw materials toward a central discharge zone from the area surrounding said zone comprising a conveyor mounting member at said zone, an arm connected with said member for swinging movement around said member about a substantially vertical axis, a conveyor carrier mounted on said arm, said carrier movable on said arm toward and away from said axis, releasable means operable to restrict said carrier to a plurality of positions on said arm at selected varied spacings from said axis, an auger mounted to said carrier and extending therefrom in a direction transverse to said arm, and drive means on said carrier and operable to rotate said auger about its longitudinal axis.

6. A materials conveyor operable to draw materials toward a central discharge zone from the area surrounding said zone comprising a central pivot in said discharge zone, an auger having one end adjacent said discharge zone, means connecting said auger with said pivot for rotation of said auger about said pivot whereby the auger is capable of swinging movement around said discharge zone, the longitudinal axis of the auger being offset laterally from said pivot, and means operable to change the distance of offset of said auger axis from said pivot whereby to permit variations of the effective moment about said pivot exerted by the thrust load on said auger.

7. A materials conveyor operable to draw materials toward a central discharge zone from the area surrounding said zone comprising a central pivot in said discharge zone, an arm connected at one end with said pivot and extending radially therefrom in a substantially horizontal direction, an auger carrier mounted on said arm for sliding movement along the arm toward and away from said pivot and for rotation about the longitudinal axis of the arm, means for indexing the carrier on the arm at various spacings from said pivot while leaving the carrier free to rotate on the arm, an auger connected at one end with said carrier and extending in a direction transverse to the arm, and power drive means for the auger mounted on the carrier and drivingly connected with said auger.

8. A materials conveyor operable to draw materials toward a central discharge zone from the area surrounding said zone comprising a central pivot in said zone, an arm connected with and extending laterally from said pivot, said arm swingable about said pivot, a motor-driven auger mounted on said arm with the auger extending transversely of the arm, said auger mounted to said arm for sliding movement of the auger lengthwise of the arm and rotation of the auger about the axis of the arm, and adjustable stop means for selectively maintaining said auger at a predetermined lengthwise position with respect to the arm.

References Cited in the file of this patent

UNITED STATES PATENTS

| | | |
|---|---|---|
| 2,711,814 | McCarthy | June 28, 1955 |
| 2,768,821 | Hedlund et al. | Oct. 30, 1956 |